United States Patent
Hall et al.

(10) Patent No.: US 11,630,885 B2
(45) Date of Patent: *Apr. 18, 2023

(54) METHOD AND SYSTEM FOR ONLINE THIRD-PARTY AUTHENTICATION OF IDENTITY ATTRIBUTES

(71) Applicant: ID.me, Inc., McLean, VA (US)

(72) Inventors: Blake Hall, Washington, DC (US); Matthew Thompson, Chandler, AZ (US); Tony Huynh, Gainesville, VA (US); William Kern, Leesburg, VA (US)

(73) Assignee: ID.ME, INC., McLean, VA (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/195,710

(22) Filed: Mar. 9, 2021

(65) Prior Publication Data

US 2021/0192024 A1    Jun. 24, 2021

Related U.S. Application Data

(63) Continuation of application No. 16/776,924, filed on Jan. 30, 2020, now Pat. No. 10,977,344, which is a
(Continued)

(51) Int. Cl.
*G06F 21/31* (2013.01)
(52) U.S. Cl.
CPC .................................. *G06F 21/31* (2013.01)
(58) Field of Classification Search
CPC ....... H04L 63/083; H04L 63/08; H04L 63/10; G06F 21/31
See application file for complete search history.

(56) References Cited

U.S. PATENT DOCUMENTS

| 7,412,420 B2 | 8/2008 | Holdsworth |
| 7,850,080 B2 | 12/2010 | Guillot et al. |

(Continued)

OTHER PUBLICATIONS

Jackson, W., "Illinois Crosses the Bridge," Government Computer News, Aug. 2007 (5 pages).

(Continued)

*Primary Examiner* — Mohammed Waliullah
(74) *Attorney, Agent, or Firm* — Bookoff McAndrews, PLLC

(57) ABSTRACT

A method for online authentication includes receiving membership authenticating information specific to members of a particular affiliation from the members and from one or more remote databases. The information is aggregated and stored in an aggregate database. An individual is authenticated, via a widget at least one of integrated into, and accessible by, at least one of a mobile application and a website of a provider of at least one of a particular program and a particular service, as a member of the particular affiliation based on a comparison of authenticating indicia provided online by the individual and the information stored in at least one of the aggregate database and the remote databases. Digital credentials are provided to the individual for access to the at least one of the particular program and the particular service when the individual is authenticated. The credentials include a unique identifier, a login and password.

20 Claims, 4 Drawing Sheets

Related U.S. Application Data continuation of application No. 13/799,997, filed on Mar. 13, 2013, now Pat. No. 10,592,645.

(60) Provisional application No. 61/610,992, filed on Mar. 14, 2012.

(56) References Cited

U.S. PATENT DOCUMENTS

| | | | |
|---|---|---|---|
| 8,136,148 B1 | 3/2012 | Chayanam et al. | |
| 8,510,820 B2 | 8/2013 | Oberheide et al. | |
| 2003/0163686 A1 | 8/2003 | Ward | |
| 2003/0212790 A1 | 11/2003 | Thambidurai | |
| 2004/0187036 A1* | 9/2004 | Nakamura | G06F 21/6218 726/7 |
| 2006/0031494 A1* | 2/2006 | Marcus | H04L 67/02 709/225 |
| 2009/0265753 A1 | 10/2009 | Anderson | |
| 2009/0307744 A1* | 12/2009 | Nanda | H04L 63/0807 726/1 |
| 2011/0154481 A1 | 6/2011 | Kilgore | |
| 2012/0054095 A1 | 3/2012 | Lesandro et al. | |
| 2012/0054826 A1* | 3/2012 | Asim | G06F 21/6245 726/1 |
| 2013/0047266 A1* | 2/2013 | Radhakrishnan | H04L 63/105 726/28 |

OTHER PUBLICATIONS http://www.entrust.com/piv/, Mar. 2013, (1 page).
International Preliminary Report on Patentability issued in corresponding International Application No. PCT/US2013/030834, dated Sep. 25, 2014.

\* cited by examiner

METHOD AND SYSTEM FOR ONLINE THIRD-PARTY AUTHENTICATION OF IDENTITY ATTRIBUTES

CROSS-REFERENCE TO RELATED APPLICATIONS

This application is a continuation of and claims the benefit of priority to U.S. Nonprovisional application Ser. No. 16/776,924, filed on Jan. 30, 2020, which is a continuation of and claims the benefit of priority to U.S. Nonprovisional application Ser. No. 13/799,997, filed on Mar. 13, 2013, which claims the benefit of priority to U.S. Provisional Application No. 61/610,992, filed on Mar. 14, 2012, the entire contents of which are incorporated by reference herein in their entireties.

TECHNICAL FIELD

The present principles relate generally to authentication services and, more particularly, to a method and system for online third-party authentication of identity attributes.

BACKGROUND

In general, the use of digital identification presents many difficulties. For example, it is difficult to match face/voice/appearance with an assertion of a name, an age, and so forth in order to verify the identity or some other credential of an individual. The verification of credentials other than identify would seem even more difficult to prove in view of the presumably lesser number of sources that can be used for such verification. However, digital identification can provide many benefits and can be used for many purposes if it can be implemented in an accurate and efficient manner.

As an example, businesses, non-profits and other third-party entities are currently unable to authenticate the military affiliation of military service members, veterans, and their dependents while in an online or mobile environment because the federal government does not provide a digital identification card or process to members of the military community for use on third-party websites and mobile devices. Since the very purpose of an identification card is to prevent fraud by verifying an individual's credentials, the absence of a digital identification card for members of the military community creates an information barrier that exposes businesses, non-profits, and other third-party entities to a higher risk of fraud and financial loss due to their inability to prevent non-military affiliated individuals from accessing certain programs meant exclusively for the military and/or individuals affiliated therewith.

In an attempt to validate military affiliation in a digital environment, some corporations are currently asking active service members and their dependents to scan in copies of their military identification card, which is a violation of Title 18, U.S. Code Part I, Chapter 33, Section 701 and punishable by fine and imprisonment. Moreover, asking the online user for a military e-mail address excludes the vast majority of veterans. Further, asking the online user to self-select military affiliation allows for the possibility of fraud.

As a result of current practices, there is an increased risk of identity theft to the service member, an increased legal risk to businesses violating the law by asking for scanned copies of military identification cards, and an increased risk of financial loss to businesses due to fraud. These deficiencies are not just limited to military members, but to all individuals and businesses that rely upon user verification.

SUMMARY

These and other drawbacks and disadvantages of the prior art are addressed by the present principles, which are directed to a method and system for online third-party authentication of identity attributes.

In accordance with an embodiment of the present principles, a method is provided for online authentication. The method includes receiving, membership authenticating information specific to members of a particular affiliation, from the members and from one or more remote databases configured to regularly store the membership authenticating information therein. The method further includes aggregating and storing, in an aggregate database, the membership authenticating information received from the members and the one or more remote databases. The method additionally includes authenticating, via at least one widget that is at least one of integrated into, and accessible by, at least one of a mobile application and a website of a provider of at least one of a particular program and a particular service, an individual as a member of the particular affiliation based on a comparison of authenticating indicia provided online by the individual and the membership authenticating information stored in at least one of the aggregate database and the one or more remote databases. The method also includes providing digital credentials to the individual for access to the at least one of the particular program and the particular service when the individual is authenticated by the comparison. The digital credentials at least include a unique identifier for the individual and a login and password for the least one of the particular program and the particular service.

In accordance with another embodiment of the present principles, a system is provided for online authentication. The system includes an online affiliation authenticator for communicating with one or more remote databases regularly storing membership authenticating information specific to members of a particular affiliation. The system further includes an aggregate database, in signal communication with the one or more third party databases and the online affiliation authenticator, for receiving the membership authenticating information from the members of the particular affiliation and from at least one of the one or more remote databases and for aggregating the membership authenticating information received therefrom. The online affiliation authenticator authenticates, via at least one widget that is at least one of integrated into, and accessible by, at least one of a mobile application and a website of a provider of at least one of a particular program and a particular service, an individual as a member of the particular affiliation based on a comparison of authenticating indicia provided online by the individual and the membership authenticating information stored in at least one of the aggregate database and the one or more remote databases. The widget provides digital credentials to the individual for access to the at least one of the particular program and the particular service when the individual is authenticated by the comparison. The digital credentials at least include a unique identifier for the individual and a login and password for the least one of the particular program and the particular service.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
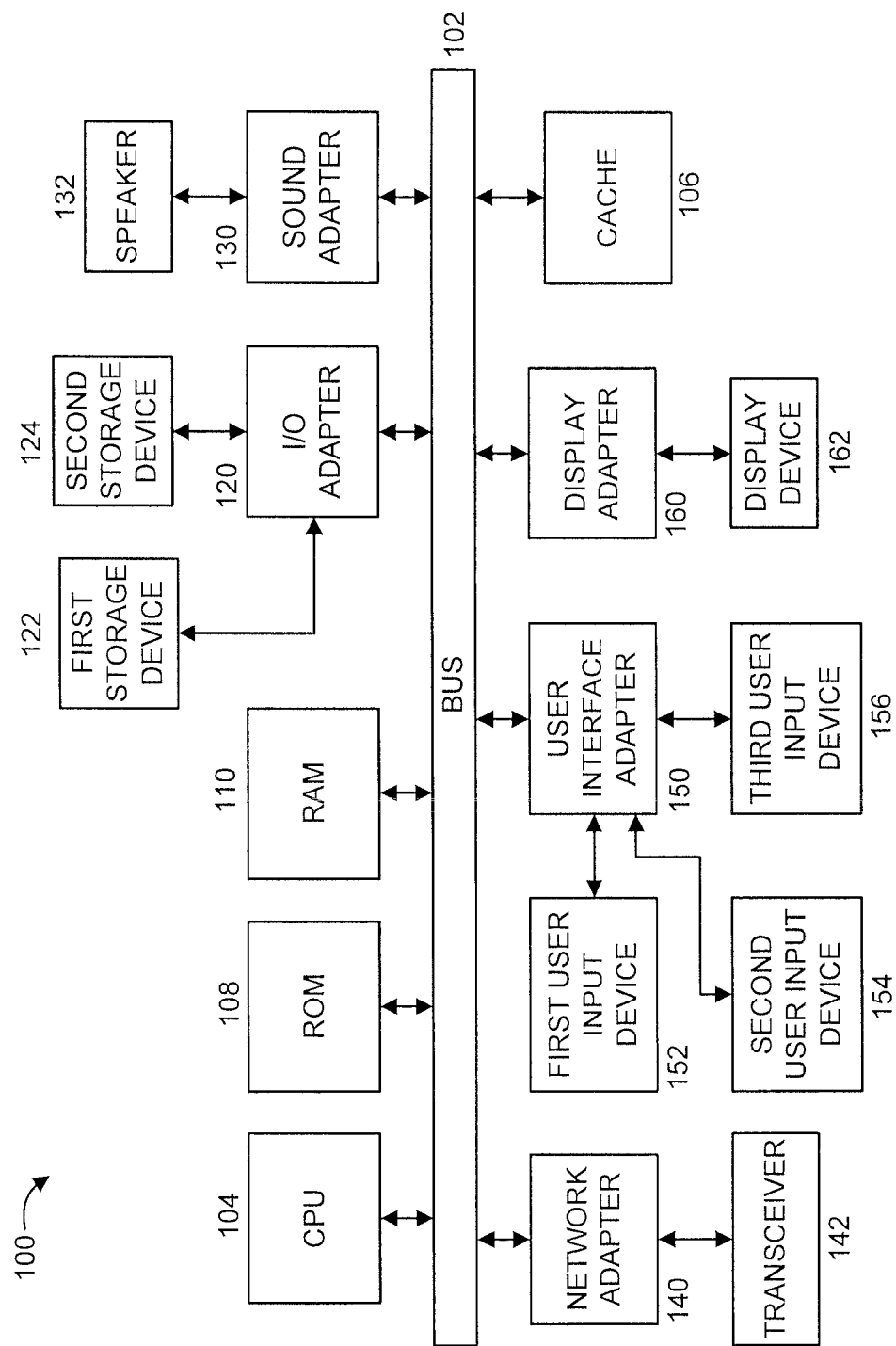
FIG. 1 is a block diagram showing an exemplary processing system 100 to which the present principles may be applied, in accordance with an embodiment of the present principles.

The present principles are directed to a method and system for online third-party authentication of identity attributes. In an embodiment, the identity attributes include membership to a particular affiliation. In an embodiment, the particular affiliation is the military community, including active service people, veterans, and their dependents. Of course, the present principles are not limited to the same and can be used with any identity attributes and any affiliation. Thus, as used herein, the phrase "membership authenticating information" includes information relating to any identity attributes and/or affiliation and capable of being used to authenticate an individual for a particular purpose.

In an embodiment, the online third-party authentication is provided to gain access to a particular program. The program can be a discount program, a rewards program or otherwise beneficial program. Of course, the present principles are not limited to the same, can be used for any purpose when an affiliation must be authenticated prior to access for that purpose. For example, the purpose can be access to a particular service, and so forth. Moreover, given the teachings of the present principles provided herein, one of ordinary skill in the art will contemplate these and other purposes to which the present principles can be applied, while maintaining the spirit of the present principles.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 104.

A first storage device 122 and a second storage device 124 are operatively coupled to system bus 104 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 104 by the sound adapter 130.

A transceiver 142 is operatively coupled to system bus 104 by network adapter 140.

A first user input device 152, a second user input device 154, and a third user input device 156 are operatively coupled to system bus 104 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

A display device 162 is operatively coupled to system bus 104 by display adapter 160.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
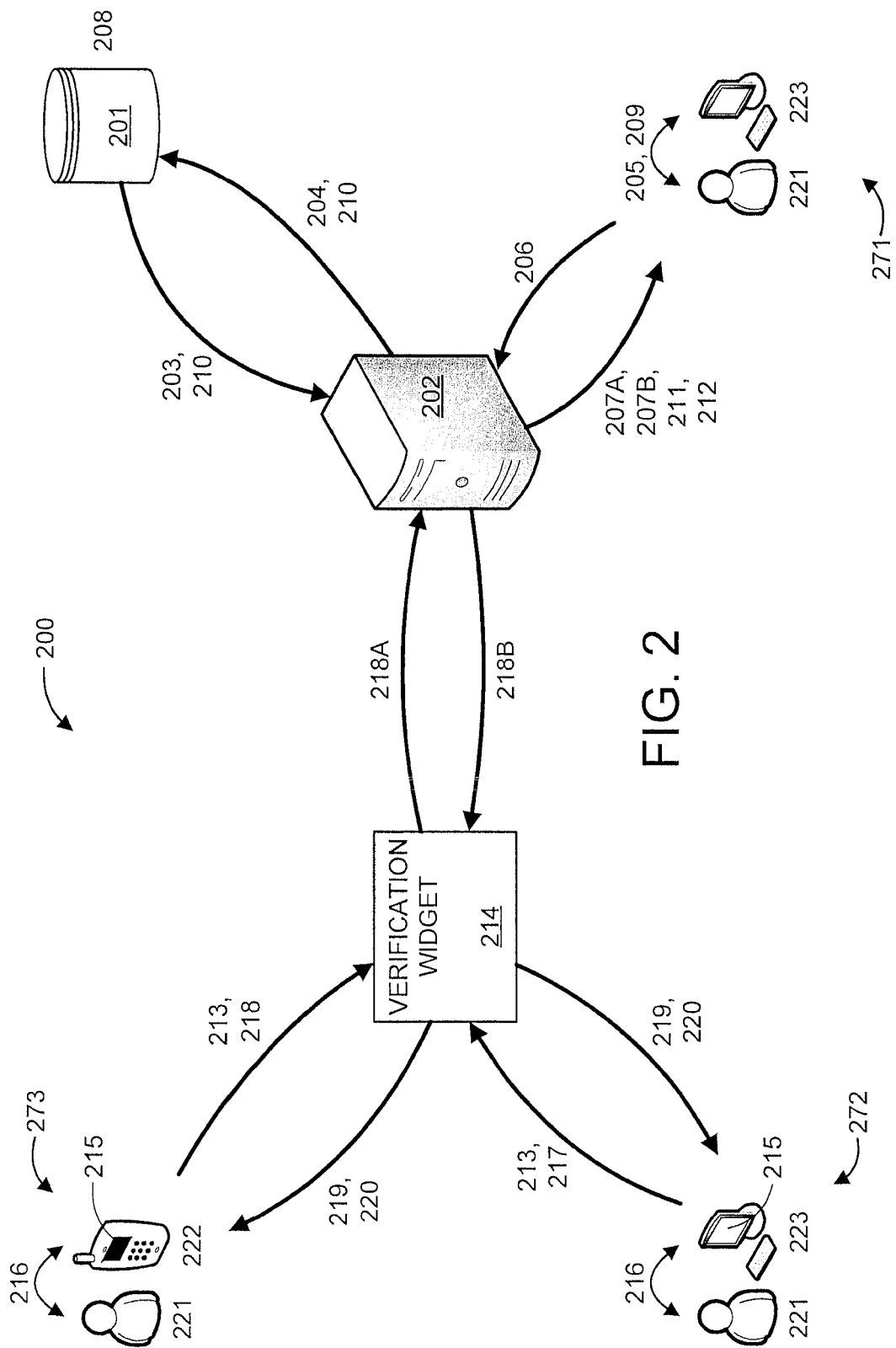
FIG. 2 is a high-level block/flow diagram showing an exemplary system/method 200 for online third-party authentication of members of the military community, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
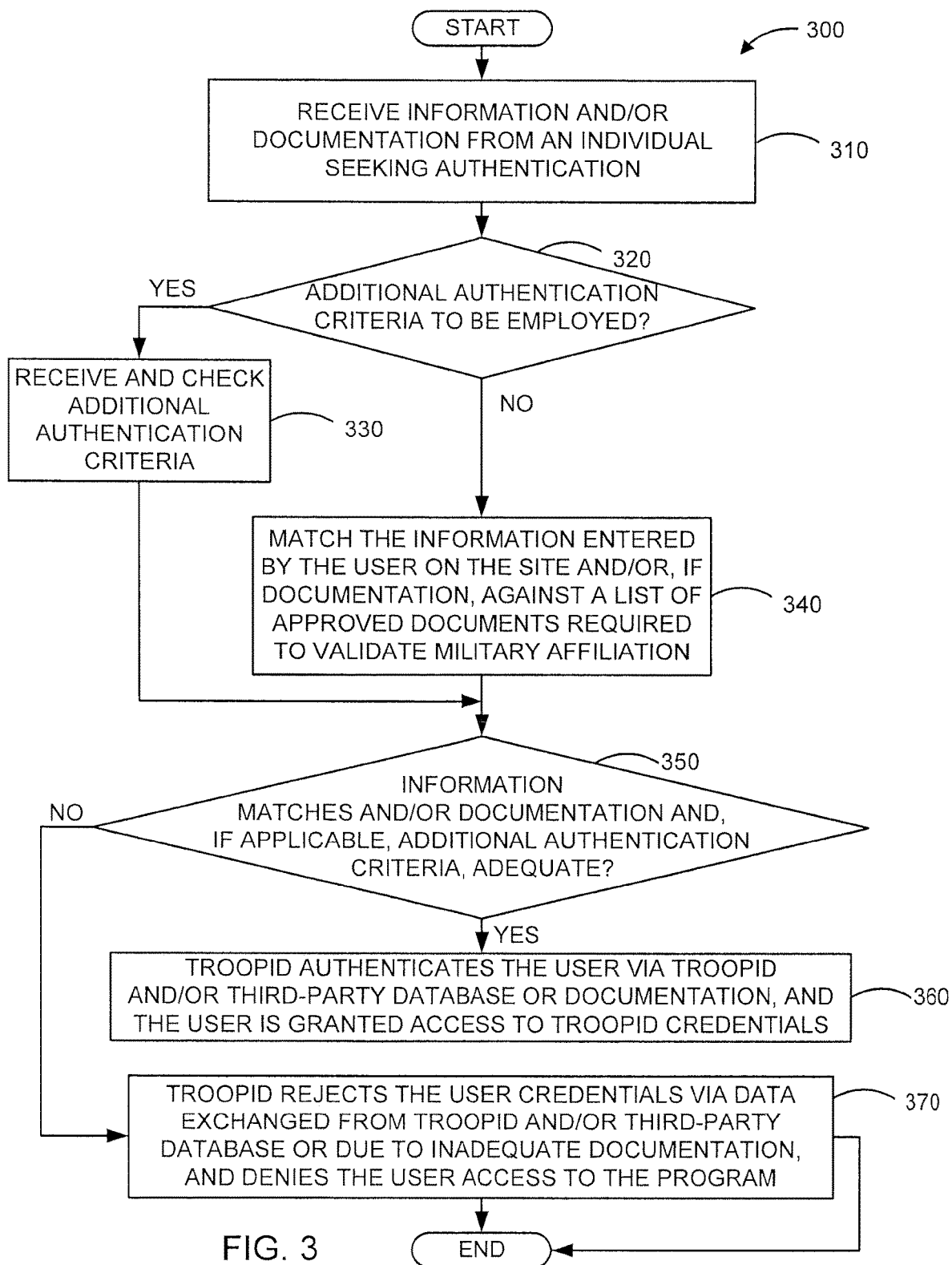
FIG. 3 is a flow diagram showing an exemplary method 300 for verifying a user's military affiliation to obtain (Troop ID) credentials, in accordance with an embodiment of the present principles.
Figure 4:
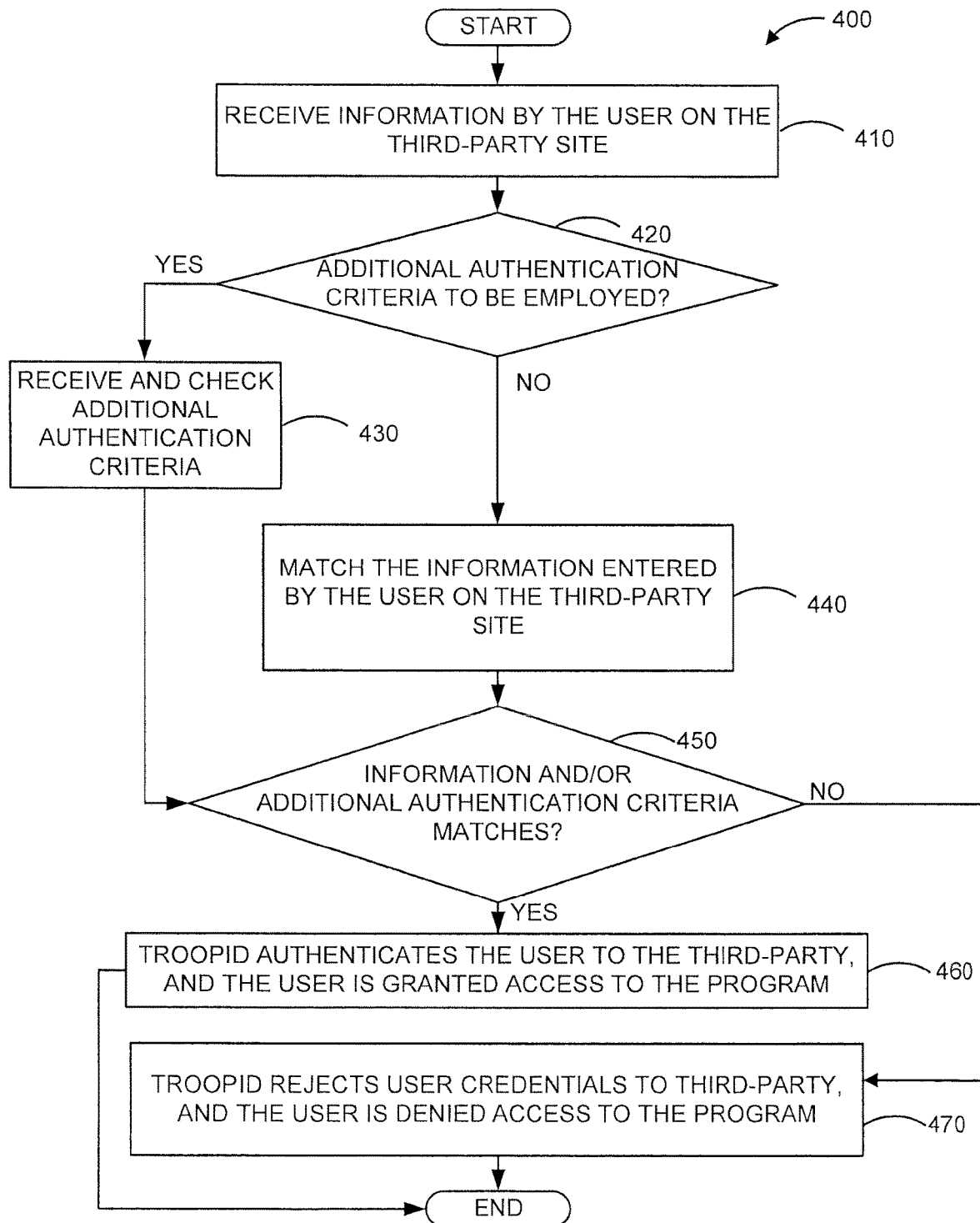
FIG. 4 is a flow diagram showing an exemplary method 400 for authenticating members of the military community using online third-party authentication, in accordance with an embodiment of the present principles.

Further, it is to be appreciated that processing system 100 may perform at least part of the methods described herein including, for example, at least part of method 300 of FIG. 3 and/or at least part of method 400 of FIG. 4. Similarly, part or all of system 200 may be used to perform at least part of method 300 of FIG. 3 and/or at least part of method 400 of FIG. 4.

While embodiments of the present principles are primarily described herein with respect to military affiliation, it is to be appreciated that the present principles can be used with respect to any affiliation for the purpose of authenticating a user as a member of that affiliation in an online and mobile environment via a digital authentication system. Thus, it is emphasized that while military affiliation is primary described, the same can be interchangeably replaced with any affiliation, while maintaining the spirit of the present principles. Thus, the term Troop ID can be interchangeably replaced with Affiliation ID and so forth. For the sake of illustration, the present principles are further described with respect to a website designated TroopID.com. Of course, other URLs can be used for this purpose, as readily appreciated by one of ordinary skill in the art. For example, different URLs depending upon the implementation can be used, in order to readily identify the affiliation. Of course, other basis can be used for URL identification, while maintaining the spirit of the present principles.

One embodiment of the present principles allows businesses, non-profits and other third-party entities to authenticate members of the military community in an online and mobile environment via a digital authentication system. Military service records held by the Department of Defense are primarily paper based, thus essentially excluding the possibility of a digital identification card enabled by the government. This is true of many more groups. For example, the RED CROSS and the AMERICAN HEART ASSOCIATION CPR credentials for first responders are also paper-based.

Also, there is no national standard for a veteran's identification card for honorably discharged service members who served for less than twenty years. This embodiment provides a single identification standard for third parties to authenticate all members of the military community in real time via a digital web service.

One embodiment of the present principles relies on aggregating authenticating information for members of the military community in a single database and providing a way for third-parties to securely access that database in order to authenticate military affiliation in real-time and in a digital environment. The verification relies on a unique identifier specific to the member of the military (or other affiliation). The unique identifier complies with all legal and regulatory standards while providing at least the following benefits relative to currently utilized methods: lowering the risk of identity theft to the member of the military community; lowering third parties administrative costs associated with manually verifying military affiliation; while also lowering the risk of fraud to the business.

FIG. 2 shows an exemplary system/method 200 for online third-party authentication of members of the military community, in accordance with an embodiment of the present principles. The elements in FIG. 2 are as follows:

201: Third-party database;
    202: Troop ID database;
    203: Outbound Application Programming Interface data exchange;
    204: Inbound Application Programming Interface data exchange;
    205: Person claiming affiliation as a member of the military community, e.g., veteran, service member, military spouse or a dependent of one of the former on TroopID.com;

206: Member data exchange with Troop ID;
207A/207B: Troop ID authentication response, yes (207A)/no (207B), to user;
208: User chooses to use third-party database to verify military affiliation on Troop ID;
209: User provides specific information required to verify military affiliation against the third-party database;
210: Troop ID exchanges data entered by user with third-party database via Application Programming Interface;
211: Application Programming Interface response that denies a user access to military credentials on Troop ID;
212: Application Programming Interface response that grants a user access to military credentials on Troop ID;
213: Troop ID Application Programming Interface to facilitate authentication of a military member on a third-party website or mobile application;
214: Troop ID widget created to integrate with third-party websites and mobile applications;
215: Third-party website or mobile application with integrated and/or otherwise accessible widget;
216: User interface on third-party website or mobile application displayed on widget;
217: Required data fields for user entry on widget;
218A/218B: Application Programming Interface for data exchange;
219: Application Programming Interface for data exchange;
220: Application Programming Interface for data exchange;
221: Member of military community;
222: Mobile device;
223: Online computer;
271: Location;
272: Location; and
273: Location.

It is to be appreciated that some of elements 201 through 220 are described in their most basic form and/or a particular form for the sakes of illustration, clarity and brevity. However, as would be readily appreciated by one of ordinary skill in the art, many of these elements can be implemented in different forms and/or be included in more encompassing elements. For example, in some embodiments, the databases 201 and 202 can be implemented on respective general purpose computers, respective special purpose computer, respective servers, respective distributed database systems, any combination of the preceding, and so forth. Of course, the same applies to the Application Programming Interfaces described herein. In the embodiment of FIG. 2, the Troop ID database 202 is shown with respect to, and as part of, a computer, given that processing is performed with respect to information stored in the database. However, other arrangements can be used, including cloud computing with respect to any of the databases 201 and 202. Moreover, while shown as a separate widget 214, the verification widget can be integrated in and/or otherwise accessible by the computer that includes the Troop ID database 202 and/or a computer that includes the third-party database 201 and/or a third-party mobile application 215 and/or a third-party website 215.

Moreover, while a third-party website and mobile application 215 are described herein, in other embodiments, they can be considered a fourth-party website and fourth-party mobile application in that the entity/entities owning and/or otherwise in charge of the third-party database(s) 101 will be a different entity/entities than that providing the website 215 and/or mobile application 215. For example, the third-party database 101 can correspond to, but is not limited to, a Veteran Service Organization, a military branch, a military bank, a pension fund, and/or so forth, while the website can correspond to, but is not limited to, a vendor or service provider that provides discounts, reward, and/or other benefits to members 221 of the military community. While mentioned in the singular, the preceding entities can involve plural entities (e.g., multiple military branches, and so forth). The first and second parties can be considered to be Troop ID and the members of the military community (or other affiliation), respectively. That is, Troop ID (and, hence, at least the Troop ID database 202) can correspond to a first party, the members of the particular affiliation can correspond to a second party, and the one or more third-party databases (201) can correspond to one or more respective third-parties. In such a case, the third-party database 201 can be considered a remote database and interchangeably referred to herein as such. Moreover, at least one of the particular program and the particular service can correspond to the one or more respective third-parties and/or one or more respective fourth-parties.

These and other variations of the elements of the present principles are readily contemplated by one of ordinary skill in the art, given the teachings of the present principles provided herein, while maintaining the spirit of the present principles.

An information exchange architecture between Troop ID and a third-party database with military affiliation data will now be described.

Referring to element 201, an existing third-party database 201 includes membership information specific to individuals whose military service has been reasonably authenticated by the third-party. The third-party can include, but is not limited to, a Veteran Service Organization, a military branch, a military bank, a pension fund, and/or so forth. While a single third-party database 201 is shown for the sake of brevity, in other embodiments more than one third-party database 201 can be used. Thus, the third-party database 201 is interchangeably referred to herein in singular and plural form. For example, each database 201 can correspond to a different third-party entity, and/or different divisions/parts of the same third-party entity and/or different information with respect to the same third-party entity or different third-party entities. As a further example, each branch of the military can involve one or more respective third-party databases corresponding thereto. Further, divisions can be made between active service members, retired service members, dependents, and so forth. Given the teachings of the present principles provided herein, these and other variations of the third party database 201 can be readily determined by one of ordinary skill in the art, while maintaining the spirit of the present principles.

Referring to element 202, the Troop ID database 202 aggregates information from third parties and individual members 221 of the military community in order to create a single standard for members of the military community to authenticate their identity while online.

Referring to element 203, an application programming interface (API) is provided to facilitate data exchange from the third-party database 201 to the Troop ID database 202. The API can be created by the third-party or some other entity on their behalf.

Referring to element 204, an API is provided to facilitate data exchange from the Troop ID database 202 to the third-party database 201. The API can be created by Troop ID or some other entity on their behalf.

A validation process on TroopID.com will now be described.

Referring to element 205, a user signs up at TroopID.com and attempts to validate military affiliation.

Referring to element 206, the user provides manual documentation or similar representations of military affiliation to a Troop ID representative. This element can be performed, for example, using a camera, a scanner, and so forth, as readily contemplated by one of ordinary skill in the art. Again, this can be provided manually to a person and/or electronically. In either case, the above and other devices can be used to upload the information. This aspect of the present principles has the potential to significantly lower fraud, since we have the equivalent of a "card-present" transaction. For example, while a hacker may be able to steal your digital information, it would be much more difficult, if even possible, to steal paper credentials (including, but not limited to, your driver's license, military ID card, first responder's status card, etc.).

Referring to element 207A, if the documentation or similar representations provided with respect to element 206 are accepted, then the user is assigned a unique identifier along with a login and password, and information regarding the user's military affiliation is stored in the Troop ID database 202. In an embodiment, the unique identifier along with the login and the password are considered "digital credentials". However, it is to be appreciated that other digital credentials can also be used, while maintaining the spirit of the present principles.

It is to be appreciated that the present principles can use static digital credentials and/or dynamic digital credentials.

As used herein, a "static digital credential" refers to a digital credential that does not need to be refreshed and/or otherwise rechecked. This is because a static digital credential pertains to a static and/or otherwise persistent attribute (e.g., a static affiliation and/or a static status). For example, once a person is verified as a veteran, then that verification (and the corresponding digital credentials related thereto) will persist since the verification pertains to a static and/or otherwise persistent attribute.

In contrast, as used herein, a "dynamic credential" refers to a digital credential that is refreshed and/or otherwise rechecked (e.g., at one or more predetermined times, randomly, etc.). Thus, in contrast to a static digital credential that pertains to a static (persistent) attribute and/or status, a dynamic digital credential can be considered to relate to a dynamic attribute (e.g., a dynamic affiliation and/or dynamic status). Hence, a dynamic credential can require Troop ID to communicate with the credential authority at a time(s) subsequent to an initial verification in order to re-verify the individual. As examples relating to a dynamic credential, if you are active duty or a college student, then Troop ID will need to re-check that credential with the government or the university where the student is enrolled in order to verify active duty/student status until that user is no longer actively associated with the dynamic attribute and is instead passed off and/or otherwise transitions to a static status, e.g., a veteran or graduate.

In an embodiment, we can modify what is referred to herein as a "credential level". For example, a credential can be "leveled up" as the value and/or risk of the transaction increases. For example, in order to claim a low risk and/or low value transaction like baseball tickets, then we might simply require verification that the user controls a .mil e-mail account and they can then use an e-mail/password to login. In the event they are trying to remotely access their medical records, however, we would require the user to "level up" their credentials by providing more information including, but not limited to, their name, social security number, date of birth, device ownership/control code, biometric(s), and so forth, to complement the password with a multi-factor login. Thus, different credential levels can be established and/or modified based on the value and/or risk associated with a specific task (e.g., purchasing an item, buying or performing a service, etc.).

Referring to element 207B, if the documentation or similar representations provided with respect to element 206 are rejected, then user is denied access to the Troop ID database 202.

Referring to element 208, the user chooses to forgo manual registration and instead chooses to verify military service via the third-party database 201.

Referring to element 209, the user is prompted to enter a combination of different fields specific to that user in order to match service affiliation against the third-party database 201, for example, but not limited to, a specific membership number, first and last name, date of birth, last four digits of their social security number, and so forth. Other authenticating and/or identifying indicia (as described in further detail with respect to FIGS. 3 and 4 below) can also be entered by the user with respect to element 209.

Referring to element 210, Troop ID exchanges the data entered by the user with the third-party database 201.

Referring to element 211, if the data entered by the user does not match the data in the third-party database 201, then the user is denied access to the Troop ID database 202 and the digital military identification program.

Referring to element 212, if the data entered by the user matches the data in the third-party database 201, then the user is authenticated and assigned digital credentials (which, in an embodiment, comprise a unique identifier along with a login and password), and information regarding the user's military affiliation is stored in the Troop ID database 202.

An information exchange architecture between Troop ID and third-party websites/mobile applications seeking to validate military affiliation for its members will now be described.

Referring to element 213, an application programming interface is provided to facilitate a data exchange from the Troop ID database 202 to third-party websites 215 and mobile applications 215 for the purpose of authenticating a user's military affiliation while browsing a third-party's digital environment.

Referring to element 214, Troop ID provides an embeddable widget 214 designed to facilitate integration into a third-party website or mobile application. In an embodiment, the embeddable widget is a software widget. The software widget can be a specific or a generic type of software application that can include portable code capable of being used on one or more different software platforms. The widget can comprise an application and/or user interface, for example, a desk accessory, an applet, and so forth. The widget can be a desktop widget, a mobile widget, a web widget, a television set widget, a hybrid widget, and so forth. The hybrid widget would include the functionality of two or more of a mobile widget, a web widget, a television set widget, and so forth. In other embodiments, a more complete software or software package can be used.

It is to be appreciated that the widget 214 is unique in the sense of passing a verified attribute to a relying party (including, but not limited to, a merchant, a learning institution, a government, a non-profit, a service provider, and so forth), and also is unique in that the widget is not confined to a point-to-point verification but rather relates to a network-based verification. As used herein, "network-based" refers to a conglomeration of parties (such as, but not limited to, vendors, service providers, government and/or entities, learning and/or institutions, and so forth) who permit the use of the same digital credentials for a given individual according to the standards set forth herein relating to the present principles. Hence, the conglomeration of parties forming the network can correspond to different entities, companies, service providers, merchants, and so forth. Thus, for example, a veteran who validates their military attribute and creates a logon for a particular website can then use that validated logon at any other participating relying party in the network without having to re-verify their credential (except, e.g., in the case of dynamic credentials as described herein, where re-verification is performed). Accordingly, the logon is not specific to any particular website, entity, and so forth, but can be used at the websites and/or mobile applications of any of the participating relying parties. In this way, parties that are part of the network can capitalize on the use of a consistent standard, capable of being increased if needed (as described herein), to realize savings due to fraud reduction, reuse economies for individual verification, and so forth, as is readily apparent to one of ordinary skill in the art, given the teachings of the present principles provided herein. Moreover, individuals gain the benefit of reduced identify theft and ease of use in having to remember digital credentials that are capable of applying to many websites and mobile applications. These and other benefits to the involved parties are readily contemplated by one of ordinary skill in the art, given the teachings of the present principles provided herein.

Referring to element 215, the third-party integrates the widget 214 into their website or mobile application 215 and/or otherwise makes the website or mobile application 215 accessible to widget 214.

A validation process on a third-party website or mobile application will now be described.

It is to be appreciated that once a user obtains digital credentials (e.g., via element 207A), the user can use those digital credentials with respect to any and all participating parties. For example, once obtained, the digital credentials can be provided to a website of a particular party (e.g., a merchant or service provider) and then provided to a mobile application of another party (e.g., a different merchant or service provider). In this way, the verified user can interact with multiple parties through their respective online interfaces (websites, mobile applications, etc.) by presenting their digital credentials in order to receive any corresponding benefits (e.g., specials, discounts, courtesies (e.g., free shipping, etc.)). Thus, from a single session during which the digital credential are received, the digital credentials can be used over and over again at all participating entities. This leads to scale efficiencies for both users and merchants. Hence, for example, the user can obtain the digital credentials while interacting with Troop ID while on computer 223 at location 271, and can then use the digital credentials to interact with a particular entity (e.g., a merchant or service provider) via third-party website 215 on mobile device 223 at location 272 and/or use the digital credentials to interact with another particular entity (e.g., another merchant or service provider) via mobile application 215 on mobile device 222 at location 273.

Referring to element 216, a user encounters the widget 214 while browsing a third-party's digital environment, for example, on a mobile device 222 or an online computer 223.

Referring to element 217, the user enters their military credentials and can enter other authenticating and/or identifying indicia (as described in further detail with respect to FIGS. 3 and 4 below) into the widget 214 through the website or mobile application 215.

Referring to element 218A, the military credentials and other authenticating and/or identifying indicia are passed back to the Troop ID database 202 in order to authenticate military affiliation.

Referring to element 218B, Troop ID returns a Yes or No response indicating whether the user is a verified Troop ID member.

Referring to element 219, if the user is not authenticated as a member of the military community (based on the credentials/indicia provided with respect to element 218), then the user is denied access to a special program or service intended for the exclusive use of members of the military community provided by the third-party website or mobile application 215.

Referring to element 220, if the user is authenticated as a member of the military community (based on the credentials/indicia provided with respect to element 218), then the user is granted access to a special program or service intended for the exclusive use of members of the military community provided by the third-party website or mobile application 215.

FIG. 3 shows an exemplary method 300 for verifying a user's military affiliation to obtain (Troop ID) credentials, in accordance with an embodiment of the present principles. Method 300 is specifically directed to the authentication performed by Troop ID (e.g., elements 205, 206, 207A, and 207B of FIG. 2).

In step 310, information and/or particular documentation is received from an individual seeking authentication (hereinafter also referred to as "the user"). The information can be received, e.g., via the Troop ID website or the third-party site 215 (e.g., in fields requesting particular types of information). The particular documentation (e.g., but not limited to, a military or other ID card, and so forth) can be received from the user, e.g., in person by a representative or online via the Troop ID website or the third-party site 215. In an embodiment, step 310 can be considered to represent the "basic" or minimum information that can be accepted in order to authenticate membership in a particular affiliation.

Regarding step 310, the same, as well as one or more of the following steps of method 300, can be performed using widget 314 as a bridge to the Troop ID database 202 and/or the third-party database 201 (and/or other databases/entities).

In step 320, it is determined whether additional authentication criteria is to be employed to authenticate the individual as a member of the particular affiliation including, but not limited to, requiring other credentials and/or involving other entities (e.g., other entities in addition to Troop ID (e.g., the Troop ID database 201) and/or the entities corresponding to the third-party database 201). This can be dependent on the merchant's requirements and so forth. If so, then perform step 330. Otherwise, perform step 340.

In step 330, the additional authentication criteria is received and checked, e.g., by Troop ID and/or the other entities. For example, Troop ID can form business partnerships with the other entities, for example, social networks, such that their membership information and/or other information are provided to Troop ID for use in accordance with the present principles. Moreover, alternatively or in addition to the preceding, results of a particular authentication criteria check such as that mentioned above regarding step 330 can be provided to Troop ID (for use by step 350).

Regarding step 330, several examples will now be provided regarding the aforementioned additional authentication criteria. Of course the present principles are not limited solely to the same and, thus, other items can also be used, while maintaining the spirit of the present principles.

For example, a white list and/or a black list can be employed. Moreover, other credential authorities/entities can be involved and/or otherwise checked such as, but not limited to, a credit rating service, an employer, a social network that the individual claims to be a member of, and so forth. Further, one or more device authentication addresses can be checked against a list of pre-approved addresses. Also, additional user authentication such as a driver license, a location, one or more biometric features, and two-factor authentication criteria using a mobile phone and/or other device can be used. Additionally, multiple credential verifications (that is, one or more credentials in addition to membership to the particular affiliation) can be employed. Moreover, an "ownership/control code" code (e.g., a separate device related password in addition to the password provided as part of the digital credential) can be sent (e.g., to a mobile or other online device) that user then re-iterates back to Troop ID and/or a third-party when the user is providing their digital credentials in order to prove that the user owns and/or otherwise controls the device that is to be used to provide their digital credentials. These are described in further detail herein below.

In step 340, the information entered by the user is matched by the Troop ID site or the third-party site 215 against the Troop ID database 202 and/or the third-party database 201 and/or, if documentation, against a list of approved documents required to validate military affiliation. Step 340 pertains to step 310, since in the embodiment of FIG. 3 the other entities relating to step 330 receive and perform their own verification, and provide the results to Troop ID.

Regarding step 340, it is to be appreciated that the Troop ID site can interact with the Troop ID database 202 and/or the third-party database 201 to determine a match.

In step 350, if the information entered by the user matches the Troop ID database information and/or the third-party database information and/or information provided by other entities and/or if the user provides adequate documentation, then perform step 360; otherwise, perform step 370.

In step 360, Troop ID authenticates the user credentials and the user is granted access to Troop ID credentials.

In step 370, Troop ID rejects the user credentials via data exchanged from the Troop ID database 202 and/or the third-party database 201 and/or due to inadequate documentation, and denies the user access to the program.

FIG. 4 shows an exemplary method 400 for authenticating members of the military community using online third-party authentication, in accordance with an embodiment of the present principles. Method 400 is specifically directed to the authentication performed on third-party websites or mobile applications (e.g., elements 208, 209, 210, 211, and 212 of FIG. 2).

In step 410, information is received from an individual seeking authentication (hereinafter also referred to as "the user") via the third-party site (e.g., in fields requesting particular types of information). In an embodiment, step 410 can be considered to represent the "basic" or minimum information that can be accepted in order to authenticate membership in a particular affiliation.

Regarding step 410, the same, as well as one or more of the following steps of method 400, can be performed using widget 314 as a bridge from the third-party website 215 to the Troop ID database 202 and/or the third-party database 201 (and/or other databases/entities).

In step 420, it is determined whether additional authentication criteria is to be employed to authenticate the individual as a member of the particular affiliation including, but not limited to, requiring other credentials and/or involving other entities (e.g., other entities in addition to Troop ID (e.g., the Troop ID database 201) and/or the entities corresponding to the third-party database 201). This can be dependent on the merchant's requirements and so forth. If so, then perform step 430. Otherwise, perform step 440.

In step 430, the additional authentication criteria is received and checked, e.g., by Troop ID and/or the other entities. For example, Troop ID can form business partnerships with the other entities, for example, telecommunication companies, financial institutions, learning institutions, government agencies, social networks, and so forth, such that their membership information and/or other information is provided to Troop ID for use in accordance with the present principles. Moreover, alternatively or in addition to the preceding, results of a particular authentication criteria check such as that mentioned above regarding step 430 can be provided to Troop ID (for use by step 450). As an example, a person can have their degree verified from a particular learning institution. However, classmates can also verify attendance and/or degree via a social network. Clearly, the learning institution is more reliable and credible, but the social network feature provides an extra level of verification.

Regarding step 430, several examples will now be provided regarding the aforementioned additional authentication criteria. Of course the present principles are not limited solely to the same and, thus, other items can also be used, while maintaining the spirit of the present principles.

For example, a white list and/or a black list can be employed. Moreover, other credential authorities/entities can be involved and/or otherwise checked such as, but not limited to, a credit rating service, an employer, a social network that the individual claims to be a member of, and so forth. Further, one or more device authentication addresses can be checked against a list of pre-approved addresses. Also, additional user authentication such as a driver license, a location, one or more biometric features, and two-factor authentication criteria using a mobile phone and/or other device can be used. Additionally, multiple credential verifications (that is, one or more credentials in addition to membership to the particular affiliation) can be employed. These are described in further detail herein below.

In step 440, the information entered by the user is matched by the third-party site 215 against the Troop ID database 202.

In step 450, if the information entered by the user matches the Troop ID database fields, then perform step 460; otherwise, perform step 470.

In step 460, Troop ID authenticates the user to the third-party and the user is granted access to the program. For example, Troop ID can provide indicia to the third party indicating a positive match result. The third-party can then grant access based on a receipt of the indicia from Troop ID.

In step 470, Troop ID rejects the user credentials to the third-party and the user is denied access to the program. For example, Troop ID can provide indicia to the third-party indicating a negative match result. The third-party can then deny access based on a receipt of the indicia from Troop ID.

By following the above listed steps, a member of the military community can authenticate their military affiliation and receive a set of digital military credentials. In turn, a third-party website 215 and/or a mobile application 215 can be integrated by following the steps listed above in order to authenticate a user's military affiliation with a reasonable degree of certainty in real-time or near real-time.

Although a user can receive digital military credentials by satisfying the requirements of just one of the two methods of verification and authentication, requiring both methods before issuing credentials would increase the certainty of a user's military affiliation. Other tests could be added in alternative embodiments, such as the additional step of verifying a user's military affiliation against government service records, but any test that requires government verification reduces the cost-effectiveness of the process and adds a delay in time to the user and to the business that detracts from the convenient nature of the preferred embodiment. In an embodiment, the government verification is limited to paper-based verification. This is because users who make a false assertion of military status with respect to a government database run the risk of perjury, falsification of data, and misuse of government resources. Hence, in this case, even if their physical paperwork is not received right away from Troop ID to verify, the user has a strong disincentive to make a false claim that has the potential to make them criminally liable for the false claim. In an embodiment, Troop ID informs a user of such potential criminal liability as a further deterrent during the verification process.

It is to be appreciated that the one or more third party databases 201 can thus comprise a government maintained records database. In an embodiment, the government maintained records database can include government service records. The government service records can pertain to military service and/or any government service. Thus, in an embodiment of the present principles, the authentication can be used with respect to pension plan verification and/or access (e.g., to benefits, explanation of benefits, and so forth), as well as other purposes. These and other embodiments of the present principles are readily determined by one of ordinary skill in the art, given the teachings of the present principles provided herein, while maintaining the spirit of the present principles.

When integrated into third-party websites and mobile applications 215, the verification widget 214 can pass unique identifying information specific to a single user back through the application programming interface to the Troop ID database 202. Provided the information passed via the widget 214 is authenticated, the widget 214 allows authenticated users to present their digital military credentials to third-party websites or mobile applications in near real-time for the mutual benefit of both parties. Businesses could choose to add more tests such as requiring users to present proof of service to a representative of the company, but any test that requires additional specialized administrative support and places an additional burden of proof on the user decreases the cost-efficiency and time savings inherent in the preferred embodiment except to the extent that the increased burden on the user maps to a greater benefit for the user, and, therefore, a greater risk to the merchant given the increased value of the transaction.

The authentication widget 214 could be developed in such a way as to verify a user's military credentials directly against the third-party database 201 without passing through an intermediary database provided that each third-party powered its own application programming interface to the widget 214. Additionally, the automated verification method at TroopID.com could precede the manual verification method. If a user was unable to authenticate military affiliation via the third-party database 201, the manual documentation test could follow easily.

The creation of a digital military identification standard may ultimately form a substitute for an actual identity card for veterans as there is no widely adopted identification card standard for veterans and their spouses who are not classified as military retirees with over twenty years of service in the military. This new standard could ultimately apply to any industry to which credentials are relevant, particularly employment, education and commerce. Additionally, the new standard could apply to the Federal government, state governments, non-profits and social networks, e.g., displaying a verified veteran credential badge on your LINKEDIN account, etc. These and other applications for the present principles are readily determined by one of ordinary skill in the art, given the teachings of the present principles provided herein.

The creation of a digital identification system can ultimately enable the creation of a physical identification card for each user or link the credential to a credit/debit card or a mobile device via a QR code or similar method of rendering a credential via a mobile device for the same intended effect. The digital identification card may be used as a loyalty device by retailers who wish to offer discounts and services to members of the military who authenticate with their military credentials. The digital identification tool may also be used to verify eligibility for certain types of financial aid specific to members of the military. Employers may use the digital identification system in order to determine an employee's eligibility, or the company's qualifications, for certain employment programs specific to members of the military.

A description will now be given of some examples of the additional authentication criteria that can be received and checked as per steps 330 and 430 in FIGS. 3 and 4, respectively.

In an embodiment, a white list and a black list can be added to the Troop ID database 202 for use by the widget 214. The white list can specify individuals to be provided further consideration by the authenticating step (e.g., individuals for which the authenticating step described herein will be permitted to continue once they have been established as being specified on the white list). The black list can specify the individuals to be denied further consideration by said authenticating step (e.g., individuals for which the authenticating step described herein will not be permitted to continue once they have been established as being specified on the black list). That is, individuals specified on the black list will then be authenticated.

As an example, identities of previously denied individuals, persons known to have previously perpetrated identity and/or other fraud, and so forth, can be added to the black list. In fact, when available, criminal history can be considered in the verification process. In an embodiment, particularly relevant crimes (or any crimes, or felonies, and so forth) such as impersonation, identity fraud, insurance fraud, and so forth, can be considered and used as a basis to deny digital credentials/access. In an embodiment, the preceding can be used to deny digital credentials/access even if the individual is an actual member of the particular affiliation. In this way, an extra level of scrutiny can be utilized and an overall smaller, but more desirable, membership pool can be derived. Merchants may desire this extra level of scrutiny and can specify whether or not to use this option. In contrast to the black list, identities of known members of the affiliation can be added to the white list. In an embodiment, the white list can include and/or otherwise be limited to members in good standing based on certain criteria. In this way, authentication can be expedited using these lists.

In an embodiment, other credential authorities/entities such as a credit rating service, an employer, a social network (FACEBOOK, LINKEDIN, TWITTER, and so forth) that the individual claims to be a member of, and so forth, can be included in the authentication process. In the preceding case, as examples, a website, a program, and/or a service maintained and/or otherwise corresponding to at least one of the aforementioned credential authorities/entities can be used, as well as, for example, a particular representative (a person) thereof. These additional checks can be used to verify with more certainty whether an individual is who he or she says he or she is, and/or whether or not they really belong to a particular affiliation and/or otherwise have a certain credential.

In an embodiment, we can add a device authentication address (e.g., but not limited to, an Internet Protocol (IP) address or a media access control (MAC) address) so that the verification process does not even commence or does not successfully complete until one or more addresses of at least one (or more) involved device (e.g., particularly the alleged member side device) are verified. The addresses and/or the devices corresponding thereto can be those expected to be associated with a particular person, a particular location, and/or a particular entity, and included in an approved list of addresses. For example, certain pre-approved locations can be used to sign into the Troop ID program to receive digital credentials therefrom. Accordingly, the IP addresses and/or MAC addresses associated with those pre-approved locations (in particular, devices at those pre-approved locations) can be used in the authentication process, possibly to the exclusion of addresses not associated with those pre-approved locations.

In an embodiment, additional user authentication such as a driver license, a location, one or more biometric features (e.g., but not limited to, fingerprint, iris, retina, voice, and so forth), two-factor authentication criteria (requiring the presentation of two or more of the three authentication factors: a knowledge factor ("something the user knows"); a possession factor ("something the user has"), and an inherence factor ("something the user is"), e.g., using the mobile phone and/or other device, and so forth can be used.

In an embodiment, the authenticating step can include using additional credential authorities for multiple credential verifications. The additional credentials (in addition to membership in the particular affiliation) can include, but are not limited to, one or more of university enrollment, academic degree verification, military service, first responder status, a particular occupation type, an employment status and so forth.

In an embodiment, the particular programs and/or services and action to which an authenticated member of an affiliation can gain access to and/or otherwise perform can include, but is not limited to, medicine refill, healthcare, a gym and/or other facility (for example, requiring a paid membership), and so forth.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A method for online authentication, comprising:
determining user authenticating information for authenticating the identity of a user;
determining membership authenticating information specific to members of a particular affiliation;
determining device authenticating information regarding a device associated with the user;
authenticating a first relying party associated with at least one of a particular program and a particular service, the user as a member of the particular affiliation based on the user authenticating information, the membership authenticating information, and/or the device authenticating information, wherein the first relying party is one of a network of two or more relying parties; and
upon the user being authenticated as a member of the particular affiliation, providing a digital credential to the device of the user for access to the at least one of the particular program and the particular service of the first relying party, and for access, without any further authentication, to at least one of a particular program and a particular service of any one of the network of two or more relying parties.

2. The method of claim 1,
wherein the digital credential includes a credential level, wherein the credential level is associated with a permitted value and/or a permitted risk for a specific transaction by the user, and
wherein the method further comprises:
receiving additional information, including one or more of additional user authenticating information, additional membership authenticating information, or additional device authenticating information, from the user; and modifying, based on a verification of the received additional information, the credential level of the digital credential of the user to allow a requested transaction by the user with a higher value and/or risk.

3. The method of claim 1, further comprising:
authenticating the first relying party associated with the at least one of a particular program and the particular service via at least one widget that is at least one of integrated into, and accessible by, at least one of a mobile application and a website of the first rely party, wherein the at least one widget comprises at least one of a desktop widget, a mobile widget, a web widget, a television set widget, and a hybrid widget.

4. The method of claim 3, further comprising allowing monetary transactions to be performed through the widget and between the user and any one of the network of two or more relying parties providing the at least one of the particular program and the particular service using the digital credential.

5. The method of claim 1, wherein said authenticating step further comprises using a white list and a black list, the white list specifying users to be provided further consideration by said authenticating step, and the black list specifying users to be denied further consideration by said authenticating step.

6. The method of claim 5, wherein the black list comprises identities of previously denied users and users known to have perpetrated a previous fraud.

7. The method of claim 5, wherein the black list comprises identities of users who have been convicted of a particular list of crimes.

8. The method of claim 5, wherein a user is denied the digital credential when the user is named on the black list, irrespective of whether the user is the member of the particular affiliation, based on a merchant provided preference.

9. The method of claim 5, wherein the white list comprises known members of the affiliation that are in good standing based on certain criteria.

10. A system for online authentication, the system comprising:
a data storage device that stores instructions for online authentication; and
a processor configured to execute the instructions to perform a method including:
determining user authenticating information for authenticating the identity of a user;
determining membership authenticating information specific to members of a particular affiliation;
determining device authenticating information associated with the user;
authenticating a first relying party associated with at least one of a particular program and a particular service, the user as a member of the particular affiliation based on the user authenticating information, the membership authenticating information, and/or the device authenticating information, wherein the first relying party is one of a network of two or more relying parties; and
upon the user being authenticated as a member of the particular affiliation, providing a digital credential to the device of the user for access to the at least one of the particular program and the particular service of the first relying party, and for access, without any further authentication, to at least one of a particular program and a particular service of any one of the network of two or more relying parties.

11. The system of claim 10, wherein authenticating the user as a member of the particular affiliation further includes comparing the user authenticating information against a list of pre-approved authenticating indicia.

12. The system of claim 10,
wherein the digital credential includes a credential level, wherein the credential level is associated with a permitted value and/or a permitted risk for a specific transaction by the user, and
wherein the method further comprises:
receiving additional information, including one or more of additional user authenticating information, additional membership authenticating information, or additional device authenticating information, from the user; and
modifying, based on a verification of the received additional information, the credential level of the digital credential of the user to allow a requested transaction by the user with a higher value and/or risk.

13. The system of claim 10, wherein the method further includes:
authenticating the first relying party associated with the at least one of a particular program and the particular service via at least one widget that is at least one of integrated into, and accessible by, at least one of a mobile application and a website of the first rely party, wherein the at least one widget comprises at least one of a desktop widget, a mobile widget, a web widget, a television set widget, and a hybrid widget.

14. The system of claim 13, wherein the widget allows monetary transactions to be performed between the user and any one of the network of two or more relying parties providing the at least one of the particular program and the particular service using the digital credential.

15. The system of claim 10, wherein authenticating the user as a member of the particular affiliation further comprises authenticating the user using a white list and a black list, the white list specifying users to be further considered for authentication, and the black list specifying users to be denied further consideration for authentication.

16. The system of claim 15, wherein the black list comprises identities of previously denied users and users known to have perpetrated a previous fraud.

17. The system of claim 15, wherein the black list comprise identities of users who have been convicted of a particular list of crimes.

18. The system of claim 15, wherein a user is denied the digital credential when the user is named on the black list, irrespective of whether the user is the member of the particular affiliation, based on a merchant provided preference.

19. The system of claim 15, wherein the white list comprises known members of the affiliation that are in good standing based on certain criteria.

20. A non-transitory computer-readable storage medium having computer-executable program code embodied therein that causes a computer system to perform the method comprising:
determining user authenticating information for authenticating the identity of a user;
determining membership authenticating information specific to members of a particular affiliation;

determining device authenticating information regarding a device associated with the user;

authenticating a first relying party associated with at least one of a particular program and a particular service, the user as a member of the particular affiliation based on the user authenticating information, the membership authenticating information, and/or the device authenticating information, wherein the first relying party is one of a network of two or more relying parties; and upon the user being authenticated as a member of the particular affiliation, providing a digital credential to the device of the user for access to the at least one of the particular program and the particular service of the first relying party, and for access, without any further authentication, to at least one of a particular program and a particular service of any one of the network of two or more relying parties.

* * * * *